(12) United States Patent
Halt, Jr.

(10) Patent No.: US 6,816,849 B1
(45) Date of Patent: Nov. 9, 2004

(54) ADVANCED INTERNET INTERFACE

(76) Inventor: Gerald B. Halt, Jr., 123 E. Third St., Media, PA (US) 19063

(*) Notice: Subject to any disclaimer, the term of this patent is extended or adjusted under 35 U.S.C. 154(b) by 0 days.

(21) Appl. No.: 09/318,917

(22) Filed: May 26, 1999

Related U.S. Application Data

(60) Provisional application No. 60/086,671, filed on May 26, 1998.

(51) Int. Cl.[7] .............................................. G06F 17/30
(52) U.S. Cl. ................... 707/1; 707/1; 707/10; 707/104.1; 715/508; 715/513; 709/203; 345/738; 345/744; 345/760; 345/762
(58) Field of Search ....................... 707/1–3, 10, 104.1, 707/102, 4, 9, 500, 513; 715/513, 508, 507; 345/747, 745, 738, 744, 760, 762, 749; 709/203, 217, 218, 219, 223

(56) References Cited

U.S. PATENT DOCUMENTS

| | | | | |
|---|---|---|---|---|
| 5,813,006 A | * | 9/1998 | Polnerow et al. ............. | 707/10 |
| 5,819,271 A | * | 10/1998 | Mahoney et al. .............. | 707/9 |
| 5,960,411 A | * | 9/1999 | Hartman et al. ............... | 705/26 |
| 5,978,568 A | * | 11/1999 | Abraham et al. ............ | 709/224 |
| 6,009,410 A | * | 12/1999 | LeMole et al. ................ | 705/14 |
| 6,029,141 A | * | 2/2000 | Bezos et al. ................... | 705/27 |
| 6,161,124 A | * | 12/2000 | Takagawa et al. ........... | 709/203 |
| 6,175,831 B1 | * | 1/2001 | Weinreich et al. ............. | 707/10 |
| 6,178,424 B1 | * | 1/2001 | Okumura et al. .............. | 707/10 |
| 6,185,614 B1 | * | 2/2001 | Cuomo et al. ............... | 709/224 |
| 6,208,986 B1 | * | 3/2001 | Schneck et al. ................ | 707/3 |
| 6,269,369 B1 | * | 7/2001 | Robertson ...................... | 707/10 |

* cited by examiner

*Primary Examiner*—Greta Robinson
*Assistant Examiner*—Cheryl Lewis
(74) *Attorney, Agent, or Firm*—Volpe and Koenig, P.C.

(57) ABSTRACT

An Internet interface is disclosed for tailoring of a web page to an individual user without requiring a user to disclose information that specifically identifies the user. The interface includes a user portion and a web page portion. The user portion includes a data file having information related to the user and means for automatically transmitting the data file upon initially accessing the web page. The web page portion includes data organized into sections and subsections. The web page also includes means for receiving the data file and means for analyzing and presenting the data based on information within the data file.

6 Claims, 8 Drawing Sheets

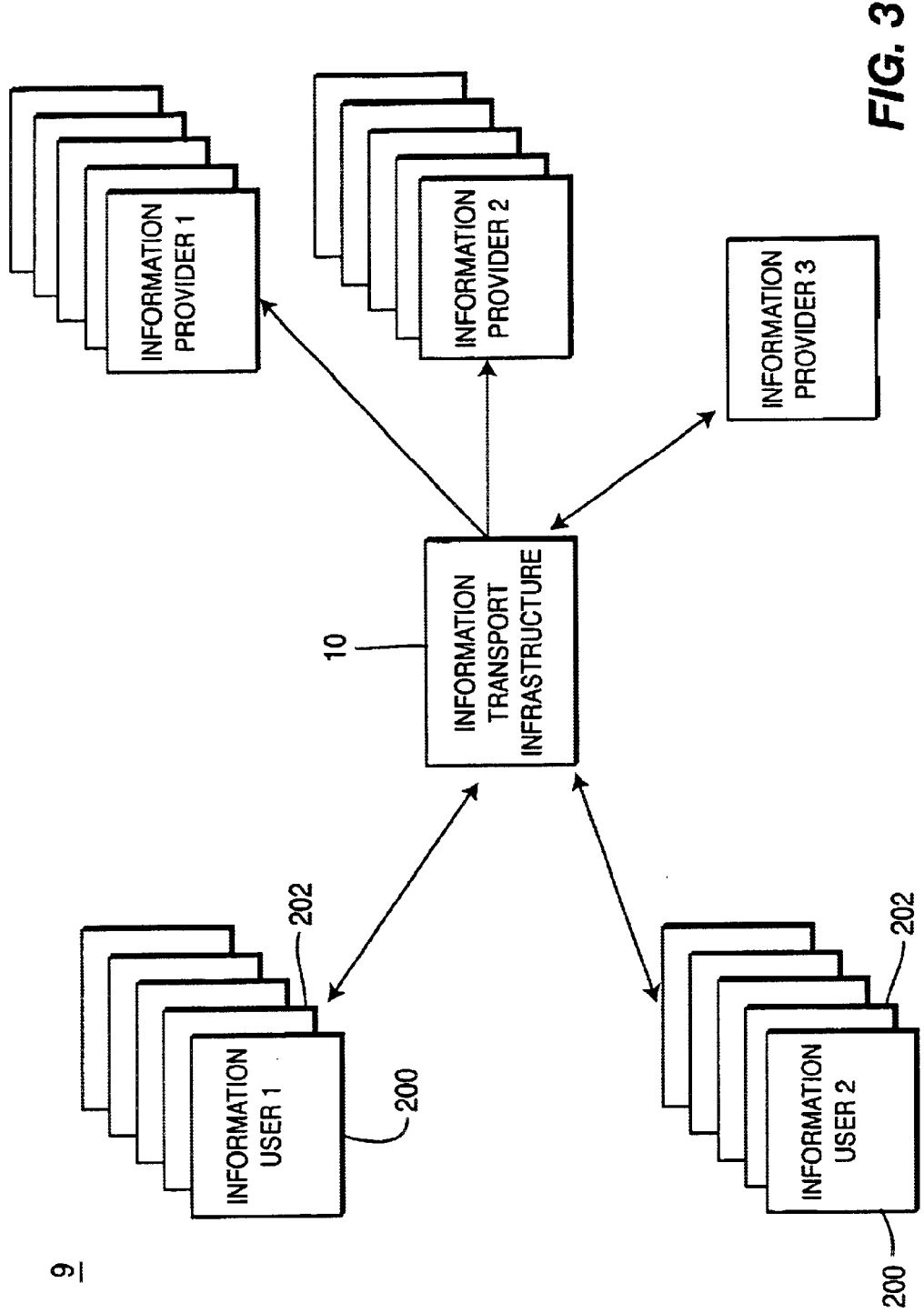

ADVANCED INTERNET INTERFACE

REFERENCE TO PRIORITY APPLICATIONS

This application claims priority from U.S. Provisional Patent Application No. 60/086,671 which was filed on May 26, 1998 entitled ADVANCED INTERNET INTERFACE.

BACKGROUND OF THE INVENTION

1. Field of the Invention

This invention pertains the global computing network otherwise known as the Internet or the World Wide Web. More particularly, the invention pertains to a system for selectively tailoring information delivered to an Internet user depending upon the particular needs of the user.

2. Description of the Prior Art

The Internet is a global computer network that is rapidly changing the landscape of the business community and has begun change the way people perceive themselves as citizens of the global community. By its very nature, the Internet provides a flexible vehicle to deliver information from any point on the globe to any other point on the globe. Providing such a vast amount of information on demand is a feat which is unparalleled in history in both size and scope. However, due to the limitations inherent with computer hardware, modems and telephonic systems, only a small portion of the capabilities of the Internet are utilized today. As the performance of computer hardware and software catches up with the expectations of the Internet-using community, the applications for which the Internet is used will increase tremendously.

Use of the Internet is in its infancy. Much to the chagrin of the Internet-using community, the press constantly features articles and commentary on the Internet which is overly simplistic and misleading. Much of the capabilities of the Internet remain more hype than fact. Since evolution of the Internet is in its rudimentary stages, no one can predict where the frontier will lead.

One of the current problems with the Internet is that inexperienced people in the business community and the user community tend to view the Internet as a natural extension (or slight modification) of the currently existing media. For example, much of the public uses the Internet as a high tech phone book whereby a user can obtain detailed information regarding a company's products, services or other background information regarding a company. A perusal of home pages currently existing on the World Wide Web confirms that home pages are currently a hybrid of the business-to-business Yellow Pages® directory and a television commercial. The home pages are unable to obtain any information regarding the specific Internet users which are contacting the home page nor are they able to deliver information tailored specifically to that user without the user experiencing a tedious "virtual gauntlet" of boring questions that they must answer time and time again for each home page that is accessed. The initial enthusiasm and mystique associated with the Internet will quickly evaporate unless Internet users and the business community begin to utilize the Internet to its fullest potential.

Accordingly, there exists a serious need for delivering useful information to an Internet user that can be depended upon to deliver quality data as reliably as current utilities are delivered.

SUMMARY OF THE INVENTION

The present invention is a system for delivering information from an information provider to an information user that is selectively tailored toward the capabilities of the information provider and the needs of the information user. The system includes an interactive interface which provides a medium for information users to communicate with information providers. More specifically, the system includes means for the information user to tailor the profile of the information user depending upon the needs or desires of the information user. Separate means permit the information provider to view the information user profile and to structure the information seen by the information user in a format that is most suitable to that information user.

The system also enables the information user to operatively tailor their profile on a real time basis. Thus, the information provider to tailor the information provided may the Internet using community depending upon the time of day, business conditions or other factors.

Accordingly, it is an object of the present invention to provide an advanced Internet interface between Internet information users and Internet information providers.

Other objects and advantages will become apparent to those skilled in the art after reading the detailed description of a presently preferred embodiment.

BRIEF DESCRIPTION OF THE DRAWINGS

FIG. 3 is a block diagram of the interface between information users and information providers over the Internet according to the present invention.

DESCRIPTION OF THE PREFERRED EMBODIMENTS

Figure 1:
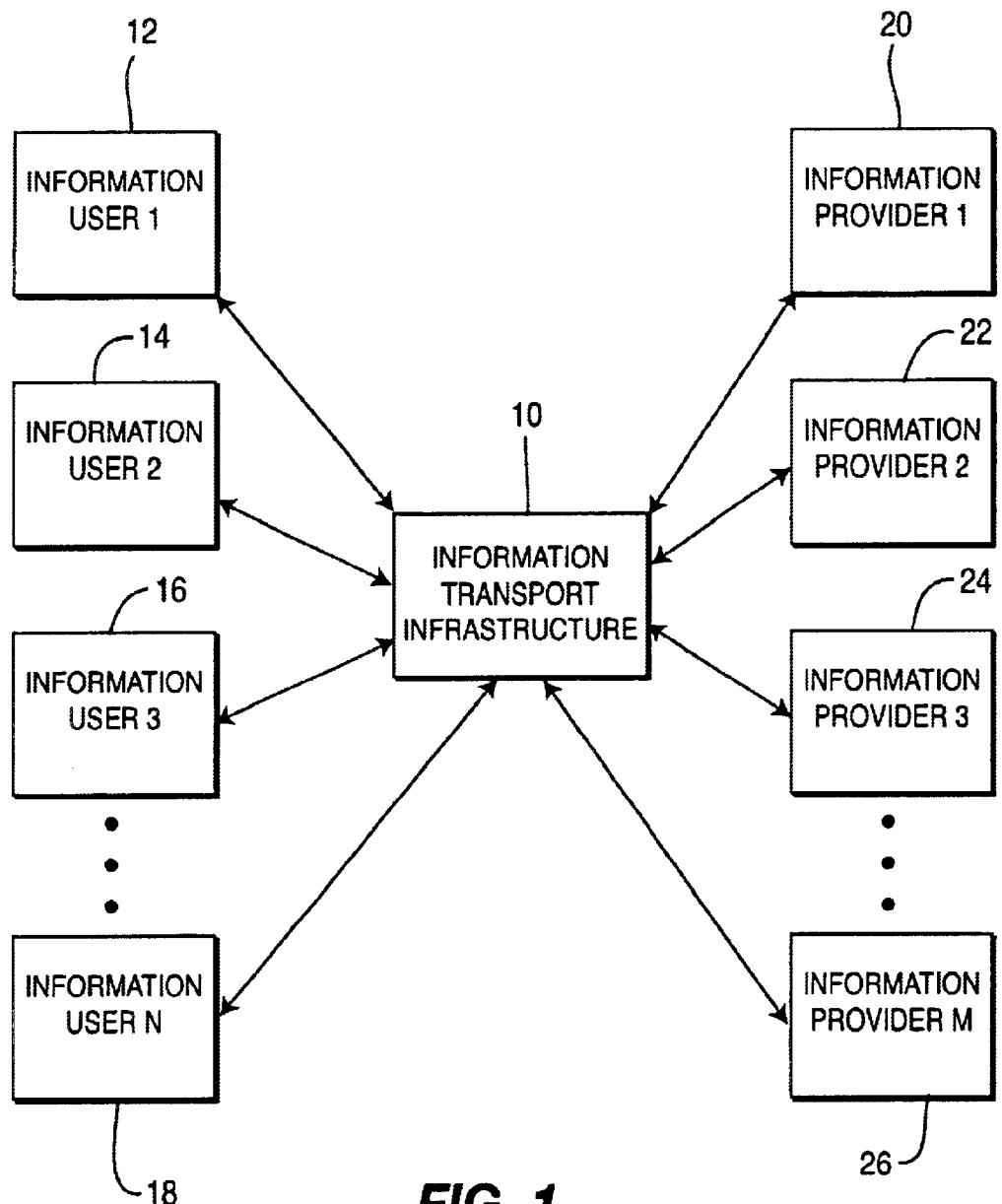
FIG. 1 is block diagram of the interface between information users and information providers over the Internet according to the prior art.

The preferred embodiment will be described with reference to the drawing figures wherein like numerals represent like elements throughout.

A block diagram of the interface between current information users and information providers over the Internet is shown in FIG. 1. The information transport infrastructure 10 includes all of the infrastructure 10 required to convey information between the plurality information providers 20, 22, 24, 26 and plurality information users 12, 14, 16, 18. This transport infrastructure 10 includes, but is not limited to, a wireless or wired public or private telephone system, a local area network (LAN) or a wide area network (WAN) upon which the information users 12, 14, 16, 18 or information providers 20, 22, 24, 26 are resident, the plurality of way stations in between, and all of the computing resources required to deliver the information. It should be recognized that this infrastructure 10 could include the local cable television (CATV) infrastructure, telephone company infrastructure or even the wires provided by the electric company over which information information may be transmitted. It should also be recognized that the information may be transmitted by satellite or microwave means and the present example should not be viewed as a specific limitation upon the scope of the present invention.

As shown in FIG. 1, as each information user 12, 14, 16, 18 utilizes the Internet to access one or more information providers 20, 22, 24, 26, each information provider 20, 22, 24, 26, such as a Web page, will appear identical to each information user 12, 14, 16, 18. There is no tailoring of information to each information user 12, 14, 16, 18. Of course, an information user 12, 14, 16, 18 can run the aforementioned "virtual gauntlet" of questions to obtain the information they require, but this process is extremely frustrating and time consuming. Additionally, much of the information requested from the information user 12, 14, 16, 18 by an information provider 20, 22, 24, 26 is standard information such as an information user's name, address and other personal or financial information.

Figure 2:
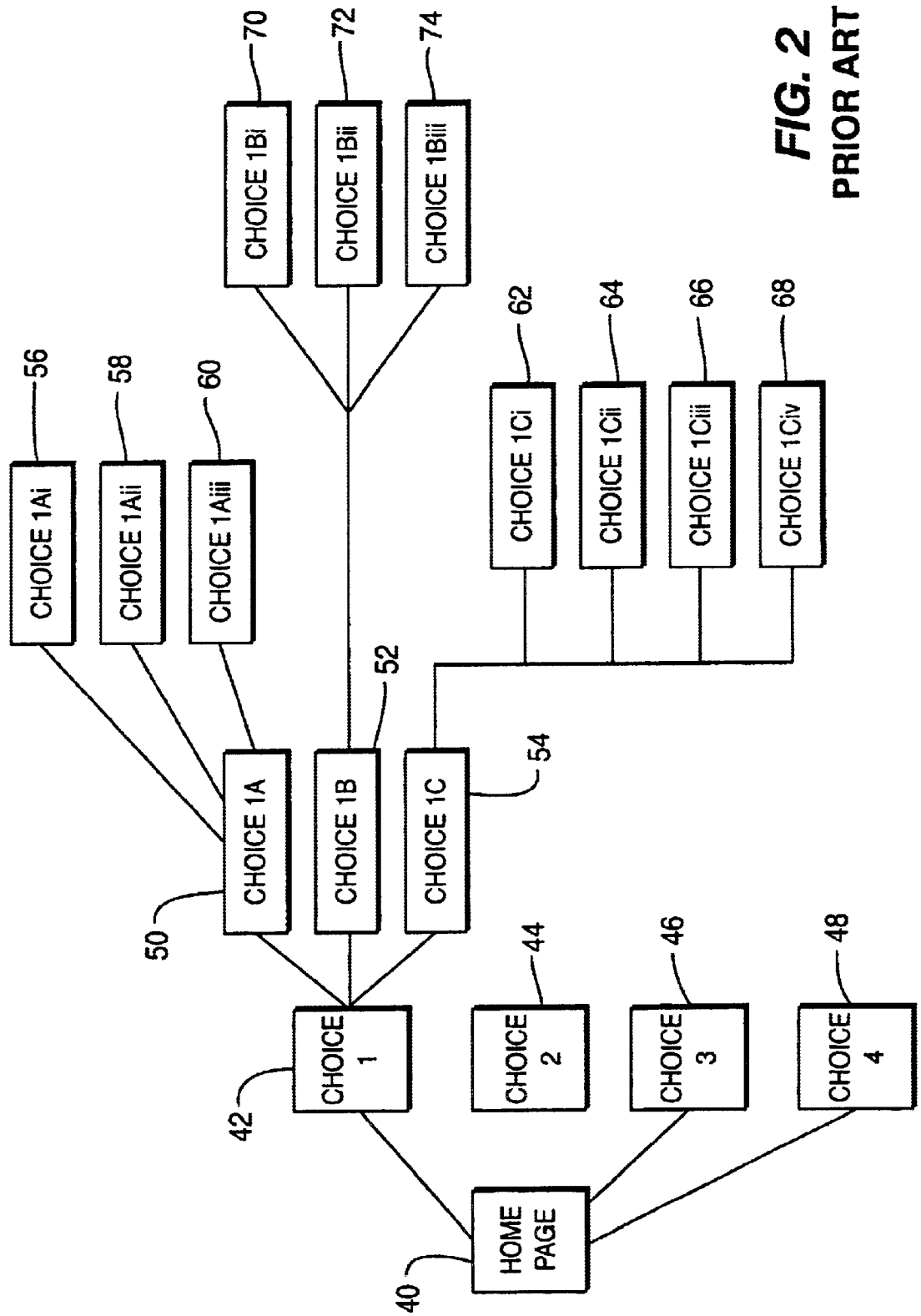
FIG. 2 is a block diagram of the web page structures according to the prior art.

Most Web pages are structured as a logical tree and branch format as shown in FIG. 2. First, the information user 12, 14, 16, 18 accesses the desired home page 40. As the information user 12, 14, 16, 18 inputs information and makes selections, the information user 12, 14, 16, 18 gains access to additional tiers of information. For example, if the first choice 42 is selected by information user 12, 14, 16, 18 on the home page 40, the information user 12, 14, 16, 18 will be shown a second tier of choices 50, 52, 54. Selection of the first choice 50 from this second tier of choices 50, 52, 54 will provide access to a third tier of information with three additional choices 56, 58, 60. In this manner, the Web page 40 will provide incremental additional information in response to the selections made by the information user 12, 14, 16, 18. Ultimately, the information user 12, 14, 16, 18 will acquire the information they need after one or more attempts or they will give up in frustration and access a competitor's home page or make a telephone call directly to the company.

The system 9 of the present invention for providing an advanced, selectively tailored Internet interface is shown in FIG. 3. As shown, both the information users 12, 14, 16, 18 and the information providers 20, 22, 24, 26 are selectable and changeable entities; in contrast to the static entities that presently comprise the Internet. As shown, the information user 12, 14, 16, 18 may tailor their information user profile as needed to acquire specific information. In this manner, one might even view the information user 12, 14, 16, 18 as having "multiple personalities."

Figure 4B:
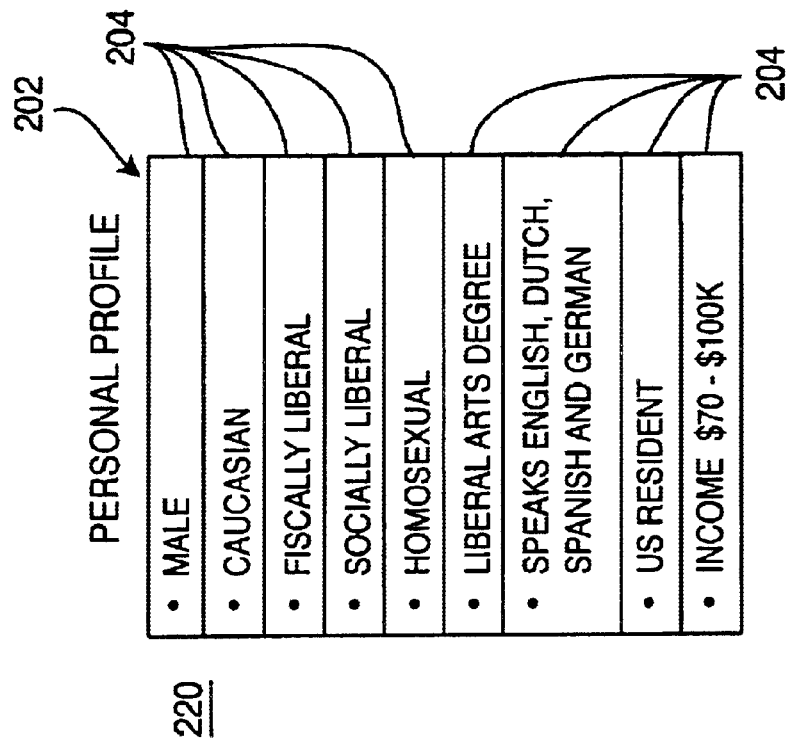
FIGS. 4A-4C are database structures of user information.
Figure 4A:
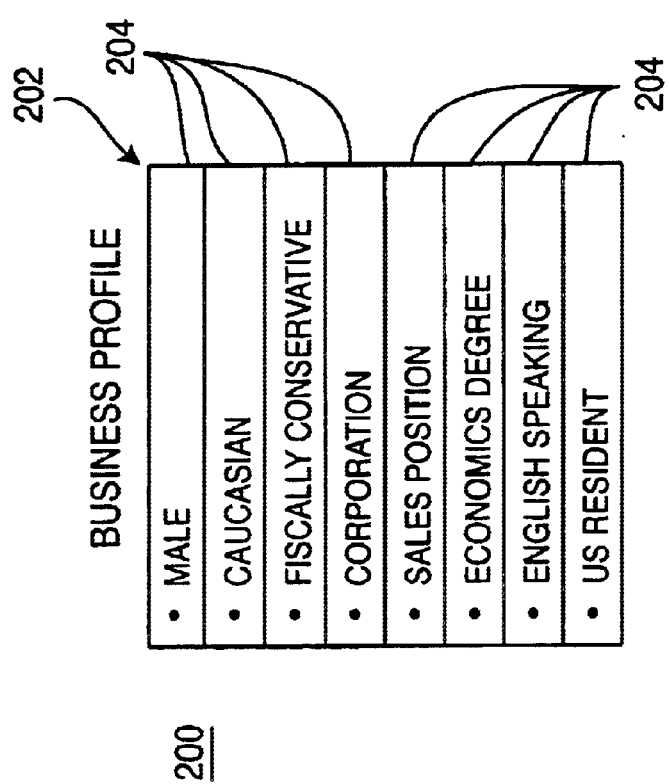

As shown in FIG. 4A, for example, the information user 12, 14, 16, 18 may have a business profile 200 which is specifically tailored toward the information user's 12, 14, 16, 18 business needs. The profile 200 comprises a file 202 having a plurality of fields 204 which hold data that the information user 12, 14, 16, 18 is male, Caucasian, fiscally conservative, politically conservative, is employed by a Fortune 500 company, is employed in a sales position, has an undergraduate degree in economics, speaks English and is a U.S. resident.

Figure 4C:
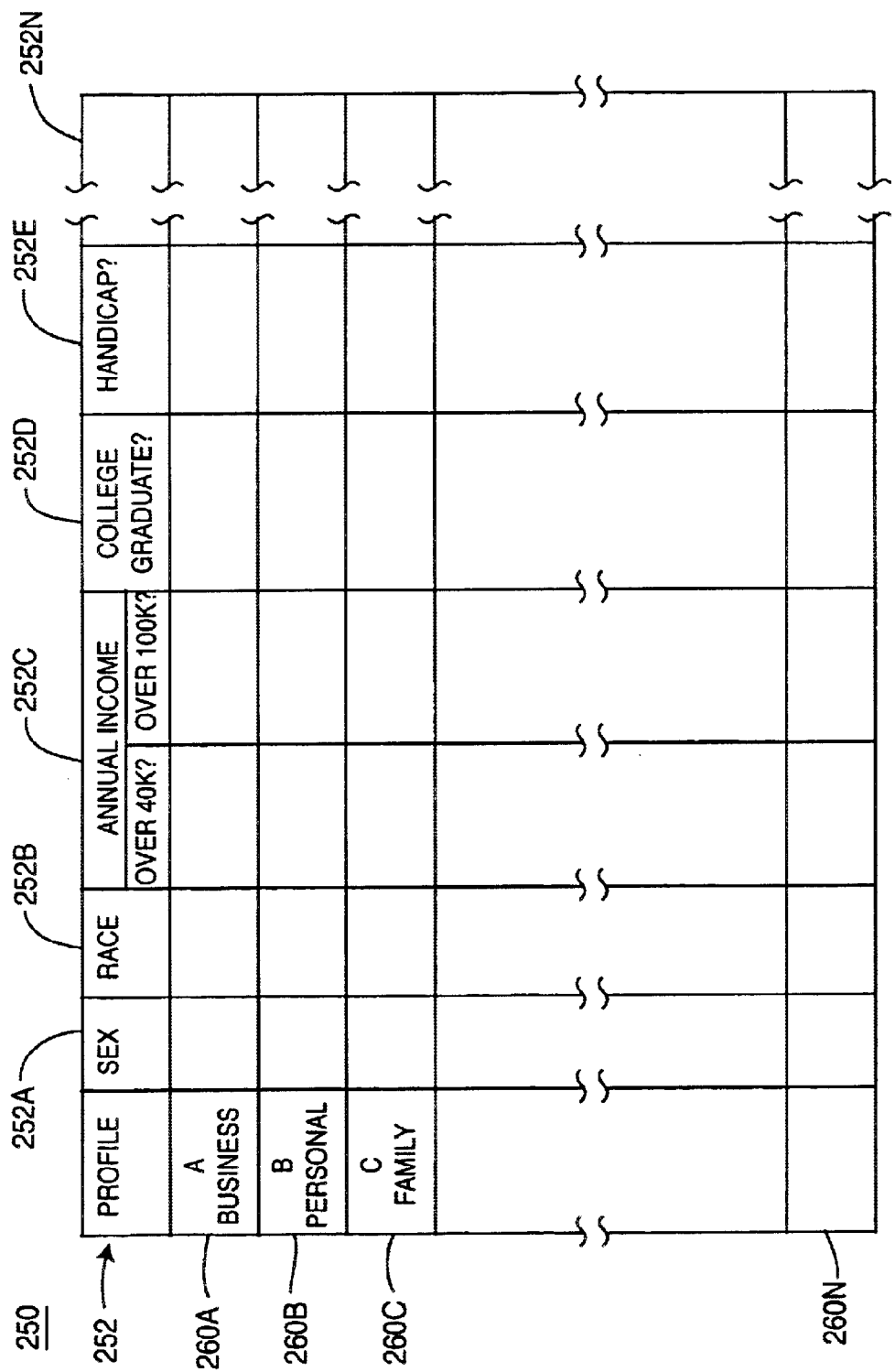

Alternatively, as shown in FIG. 4B, the information user's 12, 14, 16, 18 profile 220 for accessing the Internet for pleasure comprises a file 202 having a plurality of fields 204 which hold data that the information user 12, 14, 16, 18 is a male, Caucasian, college graduate, has a liberal arts degree, homosexual, speaks several languages, has an annual income of $70,000–$100,000 socially liberal and fiscally liberal. It should be noted that a data file 250 having a standard format as shown in FIG. 4C may be adopted by all information users 12, 14, 16, 18 and information providers 20, 22, 24, 26 on the Internet. In this manner, a user may simply check or fill-in any of those user profile attributes 252A–252N that are applicable. As shown, there are almost an unlimited number of columns which may be created to identify all of a user's attributes 252. Additionally, a plurality of profiles 260A–260N may be created by the user. For example, the user may create a business profile 260A for all of his or her business trades, and then create several personal profiles 260B, 260C for their personal traits. This profile is stored in computer memory (not shown) and transferred to an information provider 20, 22, 24, 26 when a Web page is accessed. These multiple profiles 252A–252N are not unlike the multiple personalities that currently exist in every day life for many individuals. In accordance with the teachings of the present invention, the profiles 252A–252N are selectively tailored to the needs of the information user 12, 14, 16, 18 at a particular time. Although several current Web pages permit a user to create a profile for that particular Web page, the information user 12, 14, 16, 18 must create this rudimentary profile each time they access the Web page. The present invention has the advantage that a detailed standard profile 252 may be created having an tremendous amount of detail and selectivity then this profile 252 may be utilized with any information provider that accepts the standard format.

Figure 5A:
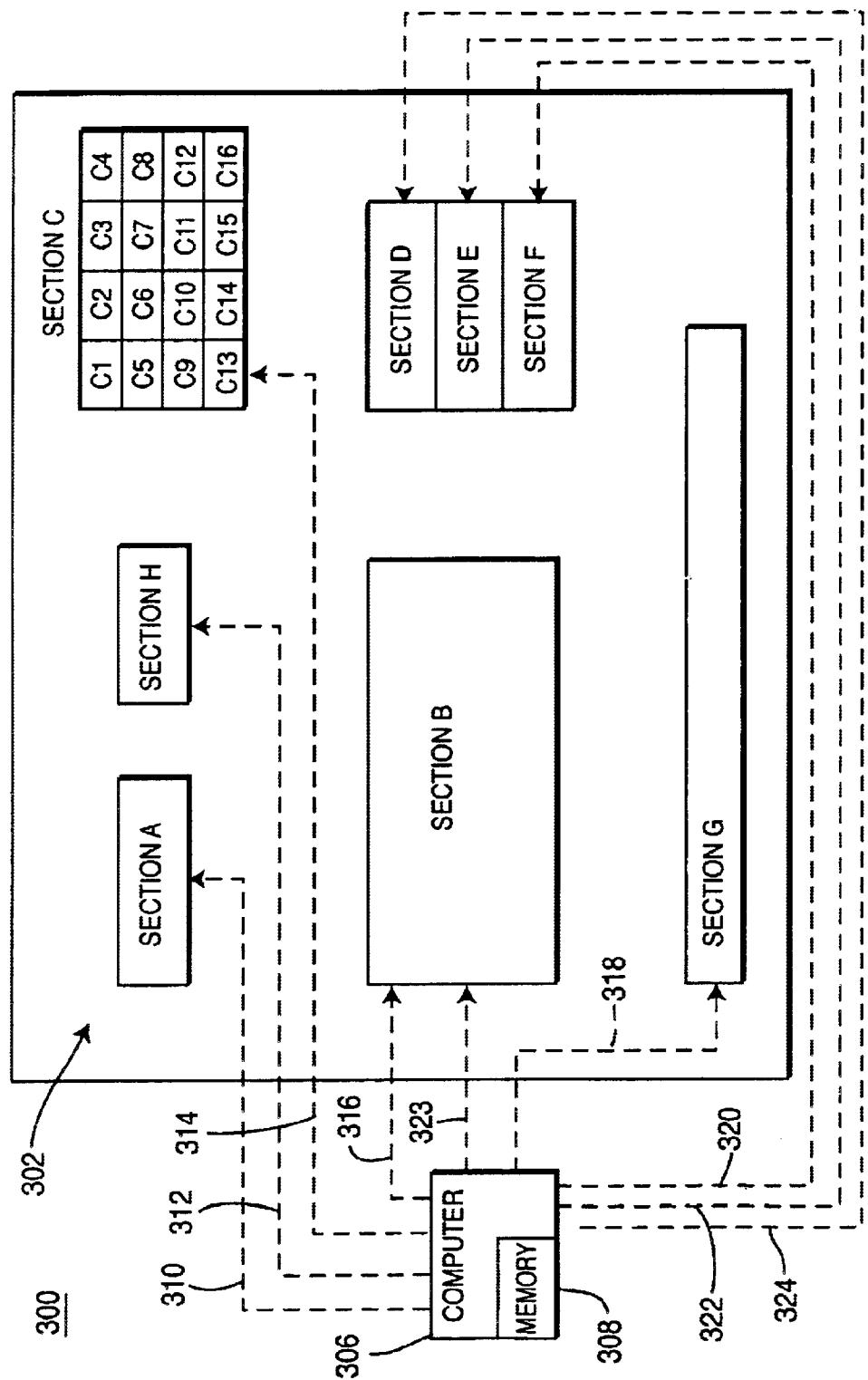
FIG. 5A is a block diagram of information provider according to the present invention.

Referring to FIG. 5A, an information provider 300 in accordance with the present invention is shown. The information provider 300 is a virtual panoply of information which is placed in a mosaic most pleasing to the information users 12, 14, 16, 18. The information on the Web page 302 may be thought of as a mosaic of electronic tiles A, B, C1–C16, D, E, F, G each of which have a portion of the Web page 302. Each tile A–G is a result of a separate data stream 310–322 which individually updates the tiles A–G. The tiles A–G may change, and the format and location of the data streams A–G may change as a result of the change in the data streams. As shown, the tiles A–G may be changed on a yearly, quarterly, daily, hourly or constant basis. Additionally, as shown, the entire Web page 302 may be changed, or only one or more portions of the Web page 302 may be changed as will be explained in detail hereinafter.

Figure 5B:
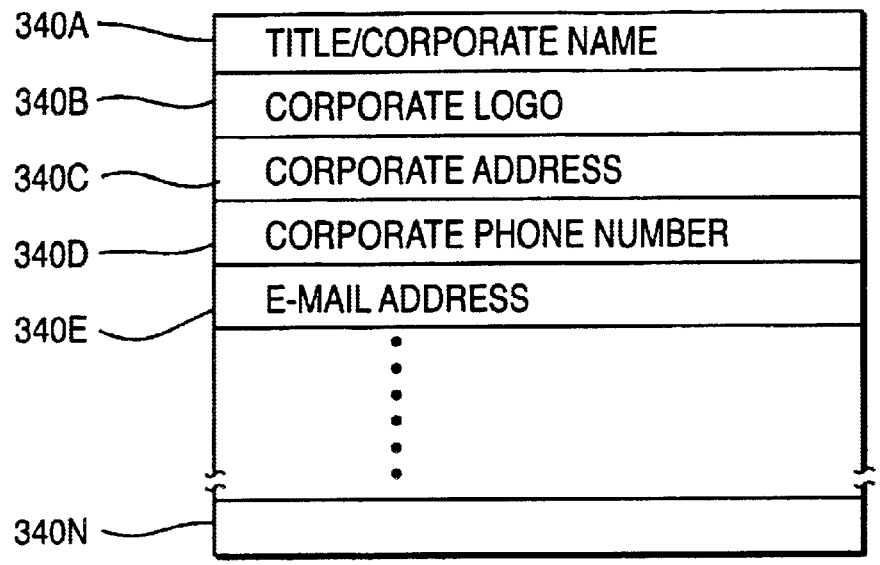
FIG. 5B is a file structure of information identifiers according to the present invention.

Each data stream 310–322 has a set of information identifiers for identifying the type of information provided by the data stream 310–322. For example, the data stream 310 which supplies section A may carry general information regarding the Web page's owner such as a corporation. The file structure of the information identifiers 340A–340N is shown in FIG. 5B. Among the plurality of other data streams 312–324 may exist intellectual property information such as a company's copyright and trademark notifications (section G) 318; directions on how to reach the corporation's headquarters (section F) 320, sales or service locations (section E) 322; and a plurality of other information related to a company's products or services (sections B, C, D and H) 323, 314, 324, 312. It should be apparent even to those with rudimentary skills in the art that the foregoing discussion regarding the data streams 310–324 involving a company's products or services may apply equally to any of the other data streams that are set forth on a Web page 300.

The tailoring of a company's information or services will now be explained in detail hereinafter. The three data streams that will be selected are a company's logo (section H) 312, a company's product line (section D) 324 and the description of the product line (section B) 323. Although some of the data streams may be individually linked, such as a product and the description of the product and the price of the product; they will be treated separately for simplification of the explanation.

Figure 6A:
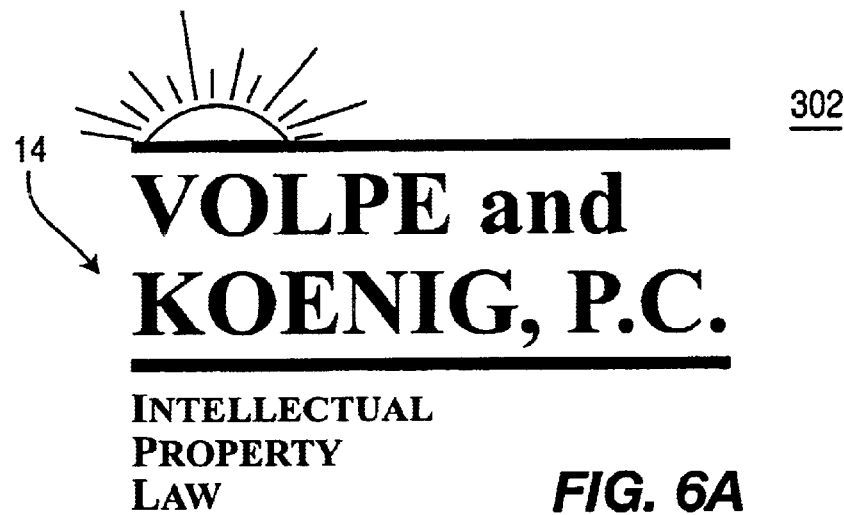
FIGS. 6A and 6B are illustrations of web pages according to the present invention.
Figure 6B:
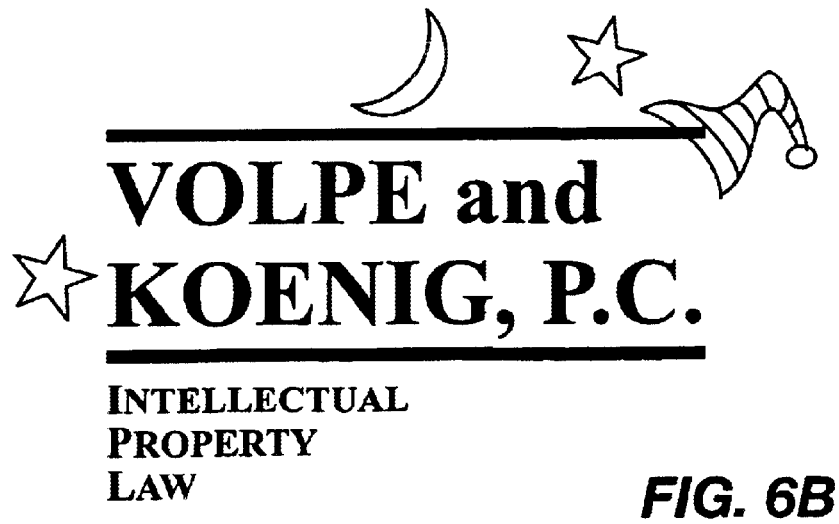

Tailoring of the data stream 312 of the company's logo will now be described. As shown in FIG. 6, this or any other data stream 310–324 may be tailored toward the time of day. This will give the information user 12, 14, 16, 18 the pleasing experience that the Web page 302 is "fresh." For example as shown in FIG. 6A, the logo H may be profiled by a rising sun during the early morning hours, a bright sun during the day and a setting sun in the late afternoon and early evening hours. The moon and stars may come out after nightfall, as shown in FIG. 6B, and would be an indication of the actual time of day. Although this may appear as a gimmick, the information user 12, 14, 16, 18 may access the Web page 302 all day long without actually seeing the same Web page 302 twice. It should be recognized that other portions of the Web page 302 may be likewise tailored. This could also be a powerful marketing concept whereby the logo might change color for a certain period of time indicating that the company's products are on sale, the stock is doing well or that the company is hiring. Any aspect of the logo H may be changed to provide useful information to the information user 12, 14, 16, 18. Additionally depending upon the profile 252 of the information the users 12, 14, 16, 18, a Japanese resident accessing a Web page may view a "sun rising" page, while simultaneously a U.S. resident will see the moon, stars and nightcap. The profile 252 will be downloaded to the information provider 20, 22, 24, 26.

Referring back to FIG. 5A, the data stream 323 concerning a company's products B will now be described in detail hereinafter. This data stream 323 is shown in greater detail in FIG. 7. As shown, the data stream 323 may comprise a plurality of separate data streams 323A–323C which change on a basis set by the information provider 20, 22, 24, 26. The first data stream 323A, for example, pertains to a company's "high end" line of products 380, the second data stream 323B may comprise a company's "middle end" line of products 382, and the third data stream 323C may comprise the company's "low end" line of products 384.

Figure 7:
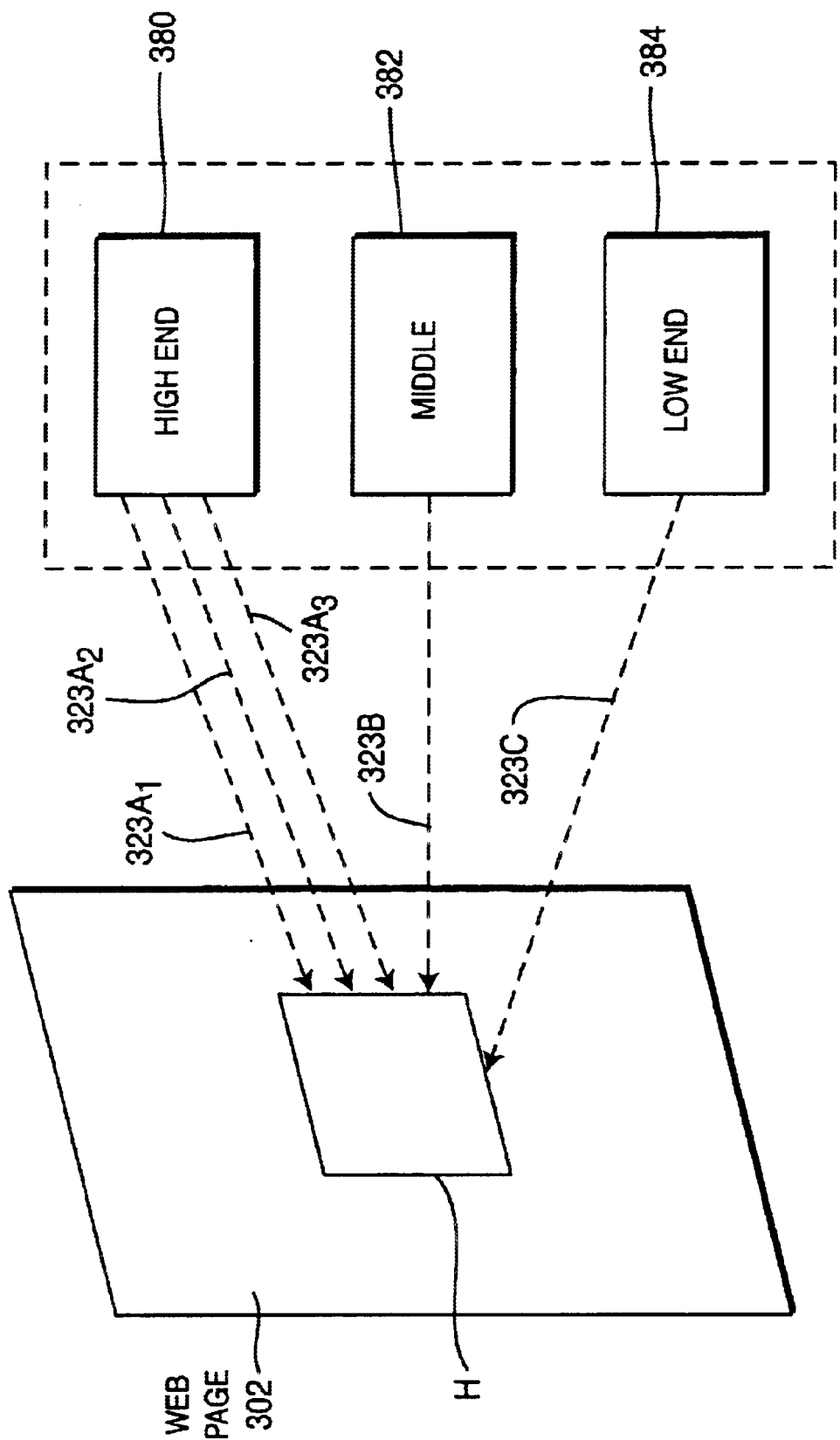
FIG. 7 is an illustration of a web page structure according to the present invention.

Each particular data stream 323A–323C may comprise the same products throughout the day as shown in FIG. 7, or may change periodically throughout the day, or based upon the time of day. For example, the high end line of products 380 may relate to gourmet coffee; the middle end line of products may relate to your average "cup of joe" 382; and the third data stream 323C may relate to your "get it hot" coffee line for people who are looking only for a caffeine intake and are willing to "choke down" any sludge 384. These three lines of products 380–384 may be displayed until approximately 11:00 a.m. Thereafter, three new high, middle and low end lines of products 380–384 are described such as a company's soda or tea beverage line. In the evening, the three data streams 323A–323C may again change to liquors used for after dinner drinks.

Referring to the high end product description data stream 323A, this data stream 323A may be selectively tailored in a different manner as will be described in detail hereinafter. For example, the data stream 323A may actually comprise three separate lines of data 323A1, 323A2, 323A3, one tailored towards very conservative, serious or older individuals 323A1, one tailored towards "no frills" type people who seek only raw data regarding a product, such as health conscious individuals 323A2; and a third data stream that is playful, light and funny for the common Internet surfer 323A3. Accordingly, going along with the present example the high end line of coffee products may be described in the conservative data stream as "a succulent blend of Columbian and Arabica beans which are blended for an exquisite taste and are dry roasted to relieve the coffee of any bitterness." This type of explanation is specifically tailored to "high income and high end serious and conservative individuals who are looking for a premium product." The description of the high end product for the "data seeking" type of individual may read as follows "a blend of 60% Arabica, 40% Columbian coffee beans is blended and freeze dried at Fed minus 60 degrees Celsius. A six ounce cup contains 100 calories, zero grams of fat . . ." For those generation X'ers who are accustomed to a "loud" advertising style, the following will suffice: "Yo! This cup of joe will be blow you away. Be the first of your friends to drink this liquid gold and have the bragging rights that you, truly, have it together." As can be seen by these differing descriptions, a conservative individual would clearly be turned off by the in-your-face manner of the third data stream. Likewise, younger individuals would most likely be bored by the first description. In this manner, a company can cater to all needs without having to boil down and sanitize a particular Web page to meet a majority market, while alienating minorities.

The most beneficial aspect of the present invention which permits a company to tailor the delivery of information to a specific user without requiring the user to input alot of mundane and unnecessary information will now be described in detail. When an individual accesses a particular Web page, the individual's current profile that the individual has selected, (for example 252A), is automatically downloaded to that Web page. The Web page manager matches the user's profile to the information identifier's 340A–340N. Depending upon the number of matches, the manager selects the data stream that corresponds most closely with the profile 252A. In this manner, the Web page manager tailors the Web page to the specific individual based on the profile. The Web page manager selects most appropriate data streams for the current information user 12, 14, 16, 18 depending upon the currently available data streams and the profile of the individual. Although there may be a standard Internet protocol developed which may require an information user 12, 14, 16, 18 to input their profile in a standard format such as 100 different sorting aspects, this is not required. The Web page manager will use those downloaded portions and will tailor the Web page accordingly.

This system allows the information provider to selectively provide information to the information user without the information user's knowledge or without irking the information user by telling them they need a password, or they need to be a member. It permits those members to get to the information seamlessly. For example, low end users may receive coupons, high end users may receive product warranty information.

Another feature of the present invention is that it includes the ability to access a web site and map the entire web site. For example, as shown in FIG. 2, when an information user selects choice 1 Ai, the person does not know what exists in choice 1 Ci until they get there. Often, the person forgets the other choices available. The present invention may either map the route which the person has gone and provide a tree and branch diagram as a picture-in-picture window within the screen or may map the entire web site upon accessing the Web page. For example, when a person access a web site, the web site navigator resident within the information user's browser may quickly go in and access every page of the web site. It will then summarize, and categorize the information in a concise manner and provide a branch and tree type map.

Although the invention has been described in part by making detailed reference to certain specific embodiments, such details is intended to be instructive rather than restrictive. It will be appreciated by those skilled in the art that many variations may be made in the structure and mode of operation without departing from the spirit and scope of the invention as disclosed in the teachings herein.

What is claimed is:

1. An Internet interface for tailoring of a web page to an individual user without requiring a user to disclose information that identifies the user, the interface having a user portion and a web page portion; the interface comprising;

said user portion comprising:
   a data file hang a plurality of user-selectable fields, each field for describing a personal characteristic of said user; and
   means for automatically transmitting said data file upon initially accessing said web page; and said web page portion comprising:
   said web page comprising data organized into a plurality of discrete sections, each section having a plurality of mutually exclusive subsections;
   means for receiving said data file; and
   means for analyzing said plurality of user-selectable fields of said data file with respect to said plurality of discrete sections; and
   means for selecting one of said mutually exclusive subsections for each section in response to said analysis; whereby said web page presents a plurality of sections that are specifically tailored for each user, each of which is related to one or more of said personal characteristics.

2. An Internet interface comprising a user unit and a web page unit for interfacing an information user with an information provider; said information provider providing at least N discrete data streams, the interface comprising:

said user unit comprising:
   means for automatically generating an information user profile having at least one user-selectable data field, said at least one user-selectable data field for identifying characteristics particular to said user, said characteristics selected from the group of age, race, sex, income and native language; and
   means for automatically transmitting said information user profile over the Internet to the information provider upon accessing said information provider; and said web page unit comprising:
   means for receiving said information user profile;
   means for analyzing said information user profile with respect to N discrete data streams; and
   for each of said N discrete data streams, means for selecting one data stream that are specifically tailored for each user from among a plurality of mutually exclusive data streams located within each of the N discrete data streams and outputting said selected data stream, said selection being in response to said analysis of the received information user profile.

3. An Internet interface according to claim 2 wherein said information provider includes a plurality of data streams, each said data stream including an information identifier for identifying the type of information provided by said data stream.

4. An Internet interface according to claim 3, whereby said data streams may be individually linked.

5. An Internet interface according to claim 4 whereby the content of said data streams changes on a basis set by said information provider.

6. An Internet interface according to claim 5 whereby each said data stream is selectively tailored to one of said data fields.

* * * * *

UNITED STATES PATENT AND TRADEMARK OFFICE
CERTIFICATE OF CORRECTION

PATENT NO. : 6,816,849 B1
DATED : November 9, 2004
INVENTOR(S) : Gerlad B. Hall, Jr.

It is certified that error appears in the above-identified patent and that said Letters Patent is hereby corrected as shown below:

Column 7,
Line 13, after the word "file", delete "hang" and insert therefor -- having --.

Signed and Sealed this

First Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,816,849 B1
DATED : November 9, 2004
INVENTOR(S) : Gerlad B. Halt, Jr.

It is certified that error appears in the above-identified patent and that said Letters Patent is hereby corrected as shown below:

<u>Column 7,</u>
Line 13, after the word "file", delete "hang" and insert therefor -- having --.

This certificate supersedes Certificate of Correction issued February 1, 2005.

Signed and Sealed this

Sixth Day of September, 2005

JON W. DUDAS
*Director of the United States Patent and Trademark Office*